United States Patent
Kikuchi et al.

(10) Patent No.: US 10,746,574 B2
(45) Date of Patent: Aug. 18, 2020

(54) MOUNTING TOOL FOR LINEAR DISPLACEMENT MEASURING APPARATUS

(71) Applicant: Mitutoyo Corporation, Kawasaki, Kanagawa (JP)

(72) Inventors: Kazushi Kikuchi, Utsunomiya (JP); Takashi Gohma, Utsunomiya (JP)

(73) Assignee: MITUTOYO CORPORATION, Kawasaki (JP)

( * ) Notice: Subject to any disclaimer, the term of this patent is extended or adjusted under 35 U.S.C. 154(b) by 388 days.

(21) Appl. No.: 15/714,017

(22) Filed: Sep. 25, 2017

(65) Prior Publication Data

US 2018/0087932 A1  Mar. 29, 2018

(30) Foreign Application Priority Data

Sep. 26, 2016  (JP) ................. 2016-187085

(51) Int. Cl.
 *G01D 5/347* (2006.01)
 *G01D 5/244* (2006.01)
 (Continued)

(52) U.S. Cl.
 CPC ....... *G01D 5/34753* (2013.01); *G01B 5/0014* (2013.01); *G01D 5/24423* (2013.01);
 (Continued)

(58) Field of Classification Search
 CPC ........... G01D 5/34753; G01D 5/34707; G01D 5/24423; G01D 5/02; G01B 5/0014; G01B 21/02; G01B 3/002
 See application file for complete search history.

(56) References Cited

U.S. PATENT DOCUMENTS 3,053,357 A * 9/1962 Stanger ................. F16B 37/043
 403/21
3,816,002 A * 6/1974 Wieg ................. G01D 5/34707
 356/395
(Continued)

FOREIGN PATENT DOCUMENTS

EP     1 462 758 A2   9/2004
JP     H05-240232 A   9/1993
(Continued)

OTHER PUBLICATIONS

Japanese Notification of Reasons for Refusal dated May 19, 2020, with English translation 13 pages.

*Primary Examiner* — Nimeshkumar D Patel
*Assistant Examiner* — Tania Courson
(74) *Attorney, Agent, or Firm* — Rankin, Hill & Clark LLP (57) ABSTRACT

There is provided a mounting tool, for a linear displacement measuring apparatus, which is capable of reducing thermal stress of a scale housing case and is detachable while having a simple structure.
The mounting tool includes a cylindrical bush inserted into a through hole drilled in the scale housing case, an O-ring interposed between an inside wall of the through hole and the bush, a mounting screw inserted into a cylindrical hole of the bush and screwed into a mounting face, and a plate spring arranged between a head part of the mounting screw and an outside face of the scale housing case, and biasing the scale housing case toward the mounting face.

12 Claims, 12 Drawing Sheets

(51) Int. Cl.
*G01B 5/00* (2006.01)
*G01B 21/02* (2006.01)
*G01B 3/00* (2006.01)
*G01D 5/02* (2006.01)

(52) U.S. Cl.
CPC ......... *G01D 5/34707* (2013.01); *G01B 3/002* (2013.01); *G01B 21/02* (2013.01); *G01D 5/02* (2013.01)

(56) References Cited

U.S. PATENT DOCUMENTS

| | | | | | |
|---|---|---|---|---|---|
| 4,060,903 | A | * | 12/1977 | Ernst | G01B 3/004 33/706 |
| 4,070,759 | A | * | 1/1978 | Nelle | G01D 5/34761 33/705 |
| 4,530,157 | A | * | 7/1985 | Nelle | G01B 5/0014 33/700 |
| 4,558,874 | A | * | 12/1985 | Williams | F16K 5/0485 277/522 |
| 4,734,994 | A | * | 4/1988 | Cusack | G01B 7/012 33/561 |
| 4,843,729 | A | * | 7/1989 | Nagaoka | G01B 7/16 33/708 |
| 5,055,980 | A | * | 10/1991 | Mochizuki | B60Q 1/007 362/462 |
| 5,137,406 | A | * | 8/1992 | Cosenza | F16B 2/005 411/113 |
| 5,167,464 | A | * | 12/1992 | Voellmer | B64G 1/641 403/13 |
| 5,363,559 | A | * | 11/1994 | McCarty | F41G 1/38 33/298 |
| 5,495,677 | A | * | 3/1996 | Tachikake | G01B 3/18 33/784 |
| 5,664,336 | A | * | 9/1997 | Zanier | G01B 5/02 33/706 |
| 6,062,570 | A | * | 5/2000 | Erickson | F16K 41/02 277/516 |
| 6,092,296 | A | * | 7/2000 | Nelle | G01D 5/34707 33/700 |
| 6,152,954 | A | * | 11/2000 | Scheiner | A61N 1/0573 607/123 |
| 6,269,546 | B1 | * | 8/2001 | Ventura | G01B 7/001 33/645 |
| 6,766,587 | B2 | * | 7/2004 | Kawada | G01D 5/34753 33/702 |
| 6,810,601 | B2 | * | 11/2004 | Tondorf | G01D 5/38 33/700 |
| 7,225,555 | B2 | * | 6/2007 | Kawada | G01B 3/004 33/706 |
| 7,284,338 | B2 | * | 10/2007 | Hager | G01D 11/305 33/1 PT |
| 7,356,940 | B2 | * | 4/2008 | Kawada | G01B 5/0014 33/706 |
| 7,780,173 | B2 | * | 8/2010 | Mullaney | F16L 5/08 174/77 R |
| 7,784,800 | B2 | * | 8/2010 | Michel | B60G 7/04 267/175 |
| 2003/0056387 | A1 | * | 3/2003 | Kawada | G01D 3/028 33/706 |
| 2006/0016089 | A1 | * | 1/2006 | Kawada | G01B 3/004 33/706 |
| 2006/0040551 | A1 | * | 2/2006 | Plecher | H01L 41/04 439/559 |
| 2007/0079519 | A1 | * | 4/2007 | Hager | G01D 11/305 33/706 |
| 2008/0224419 | A1 | * | 9/2008 | Mullaney | F16L 5/08 277/602 |

FOREIGN PATENT DOCUMENTS

| | | |
|---|---|---|
| JP | H06-042561 A | 2/1994 |
| JP | 2004-028770 A | 1/2004 |
| JP | 2004-301541 | 10/2004 |

* cited by examiner

MOUNTING TOOL FOR LINEAR DISPLACEMENT MEASURING APPARATUS

INCORPORATION BY REFERENCE

This application is based upon and claims the benefit of priority from Japanese patent application No. 2016-187085, filed on Sep. 26, 2016, the disclosure of which are incorporated herein in its entirety by reference.

BACKGROUND OF THE INVENTION

1. Field of the Invention

The present invention relates to a mounting tool for a linear displacement measuring apparatus. More specifically, the present invention relates to a structure for mounting a linear displacement measuring apparatus to an object to be measured while escaping thermal stress.

2. Description of Related Art

Figure 9:
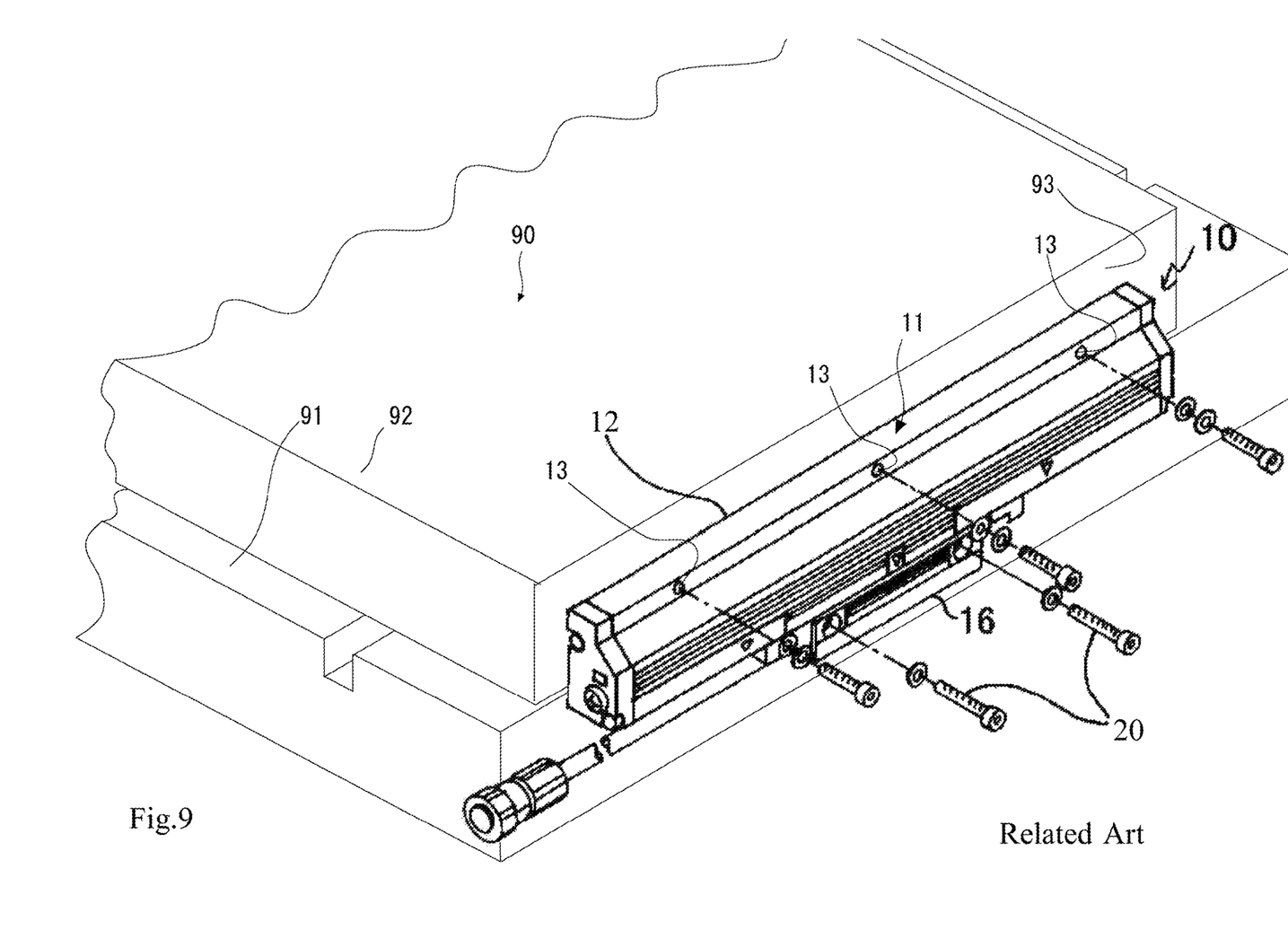
FIG. 9 is a diagram illustrating a linear displacement measuring apparatus as a background art.

There has been used a displacement measurement apparatus which is what is called an encoder to perform precise position control in various industrial machines. A linear displacement measuring apparatus is shown in FIG. 9. A linear displacement measuring apparatus 10 includes a scale part 11 and a detection head 16. The scale part 11 includes an elongate main scale (not shown) and a scale housing case 12 housing the main scale.

In an example of a photoelectric apparatus, the main scale is mainly constituted by a glass substrate, and a diffraction grating is arranged on the glass substrate. The scale housing case 12 is hollow and long, and is mainly made of (light) metal, such as aluminum. A plurality of holes 13 to be mounted and fixed is drilled in the scale housing case 12.

The detection head 16 is provided so as to be relatively movable in the longitudinal direction of the scale housing case 12, and detects relative displacement or a relative position with respect to the main scale. A plurality of holes to be mounted and fixed is drilled in the detection head 16.

The linear displacement measuring apparatus 10 is mounted on, for example, a moving stage 90. It is assumed that the moving stage 90 is constituted by a base 91 and a stage 92 which is slidable relatively to the base 91. In this case, the scale housing case 12 is screwed into a side end face 93 of the stage 92, and the detection head 16 is screwed (20) into the base 91. With this structure, it is possible to precisely measure the relative displacement of the stage 92 with respect to the base 91.

Incidentally, the moving stage 90 is also made of metal, and is mainly made of, for example, steel to secure sufficient rigidity or to prevent deformation.

Here, while the linear expansion coefficient of steel is $11 \times 10^{-6}$, the linear expansion coefficient of aluminum is $23 \times 10^{-6}$. This means that the deformation amount (expansion/contraction amount) of aluminum when temperature changes is larger than that of steel.

When the scale housing case 12 is completely fixed to the side end face 93 of the stage 92, expansion or contraction of the scale housing case 12 is restricted, and thermal stress is generated.

The thermal stress causes curves and distortion of the scale housing case 12. Consequently, curves and distortion of the main scale inside the scale housing case 12 are caused, and measuring accuracy is deteriorated. Furthermore, when the thermal stress exceeds the fastening force between the scale housing case 12 and the stage 92, a shift and looseness at the coupling part are generated. The deformation of the scale housing case 12 caused by the thermal stress leads to a problem which cannot possibly be ignored if the scale has a long length, such as 2 or 3 m. Thus, the coupling part between the scale housing case 12 and the stage 92 needs a mechanism for escaping thermal stress instead of being simply screwed.

If curves and distortion of the scale housing case 12 and the main scale can be avoided by escaping thermal stress, expansion or contraction in itself is not a fatal problem as long as linearity is kept. When expansion or contraction is only caused by temperature, the improvement of reproducibility of measurement accuracy can be (principally) performed.

Figure 10:
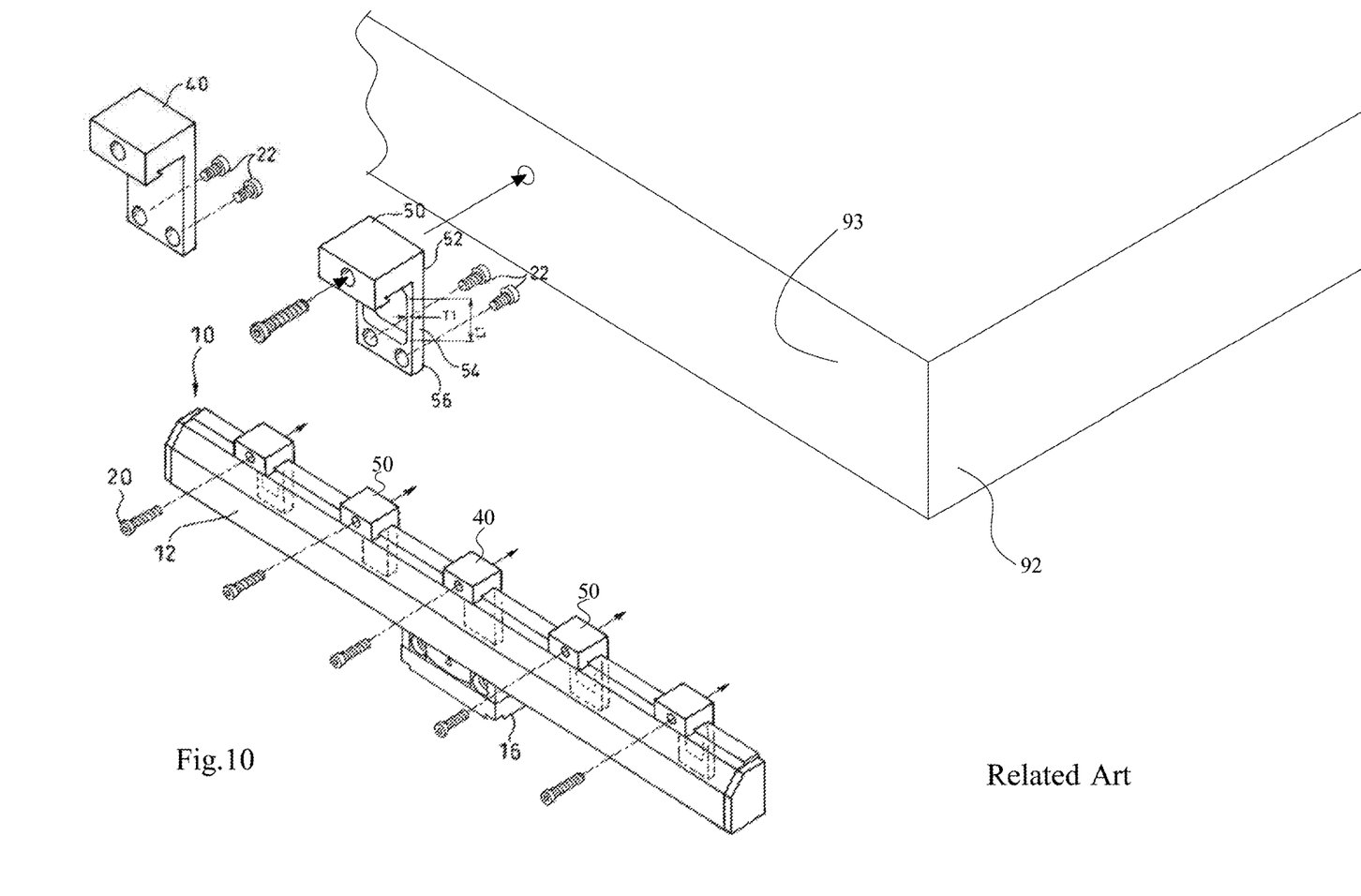
FIG. 10 is a diagram illustrating an elastic fixture as a background art.

The applicant has proposed some structures of a linear displacement measuring apparatus to reduce thermal stress (for example, JP 2004-301541 A). The elastic fixture for a length measurement apparatus disclosed in JP 2004-301541 A is shown in FIG. 10. The scale housing case 12 is mounted on the stage 92 with a permanent fixing block 40 and a plurality of elastic fixing blocks 50. The permanent fixing block 40 is an inverted L-shaped bracket which has rigidity and will not deform. The permanent fixing block 40 is mounted (22) substantially at the center of the scale housing case 12, and screwed into the side end face 93 of the stage 92.

On the other hand, the elastic fixing block 50 is a similar inverted L-shaped bracket, and the mechanism of the parallel plate spring 54 by piercing a part of it so as to be a rectangle. One end (fixing part 52) of the elastic fixing block 50 is screwed into the side end face 93 of the stage 92, and the other end (connecting part 56) is screwed (22) into the scale housing case 12.

The scale housing case 12 is fixedly screwed into the stage 92 by the one point of the permanent fixing block 40, and the origin point is fixedly secured. On the other hand, the elastic fixing blocks 50 are interposed between the scale housing case 12 and the stage 92 at the other points, and the mechanism of the parallel plate spring 54 tolerates a lateral shift. Thus, relative expansion or contraction of the scale housing case 12 with respective to the stage 92 can be tolerated. Consequently, the thermal stress of the scale housing case 12 is escaped, and curves and distortion of the scale housing case 12, that is, of the main scale can be prevented. Note that, since the scale housing case 12 is screwed (20), the linear displacement measuring apparatus 10 or the moving stage 90 can be replaced.

This structure exhibits excellent performance, but has a problem of a large number of parts. In other words, one permanent fixing block 40, a plurality of elastic fixing blocks 50, and a large number of screws are required. If the main scale has a long length such as 2 to 3 m, 20 or more elastic fixing blocks 50 are required.

Furthermore, the elastic fixing block 50 has a special shape, and the parallel plate spring 54 is to be crafted. Thus, the manufacturing cost of the elastic fixing block 50 is increased. The above structure has an advantage as long as a scale is relatively short.

However, it is difficult to use the above structure for a long scale because of installation man-hours, time, and cost.

Figure 11:
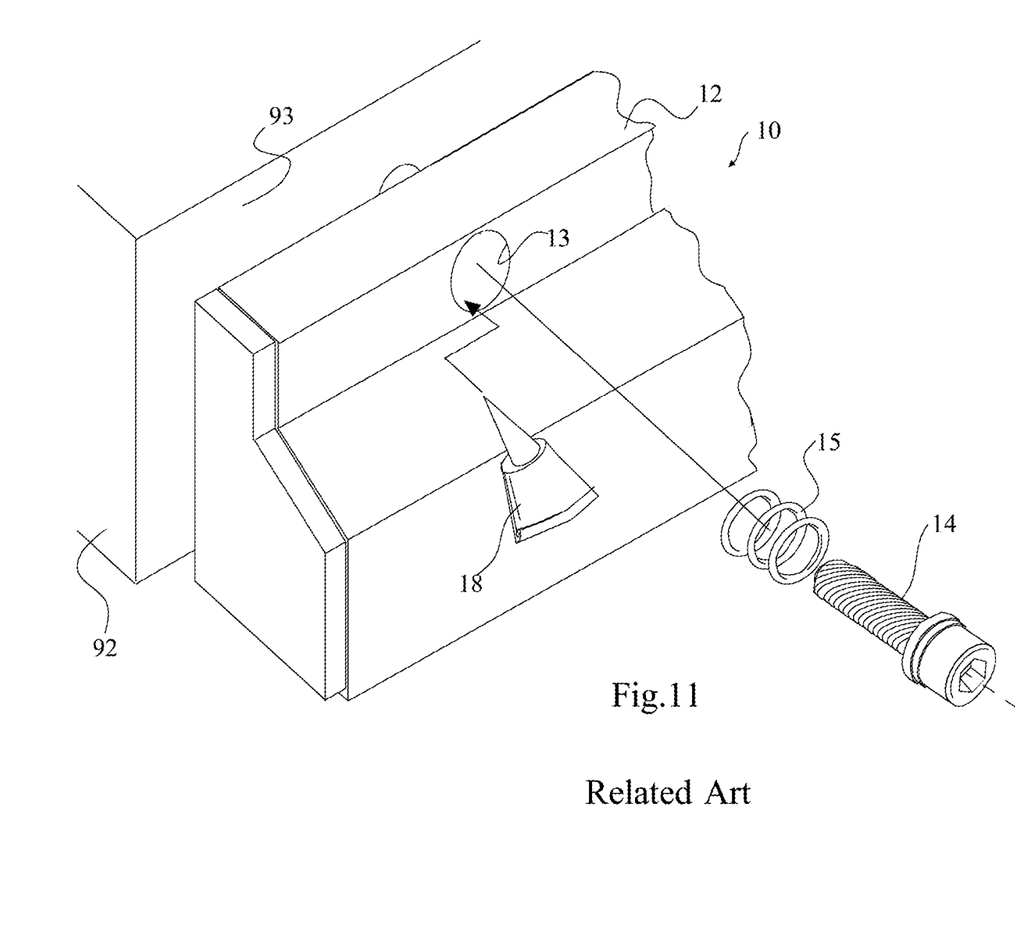
FIG. 11 is a diagram illustrating a mounting pattern using an adhesive as a background art.

Thus, the applicant adopts the following structure to reduce the number of parts. FIG. 11 illustrates a plurality of mounting holes 13 drilled in the scale housing case 12. Here, the diameter of a center hole (not illustrated) drilled substantially at the center of the longitudinal direction is substantially the same as the male screw diameter. The scale housing case 12 is fixedly screwed into the stage 92 by the center hole, and the origin point of the main scale is fixed. On the other hand, the diameters of the other holes 13 are a size larger than the diameter of a male screw 14, and a gap is left between the shaft of the screw 14 and the hole 13. This gap tolerates a lateral shift of the scale housing case 12.

Figure 12:
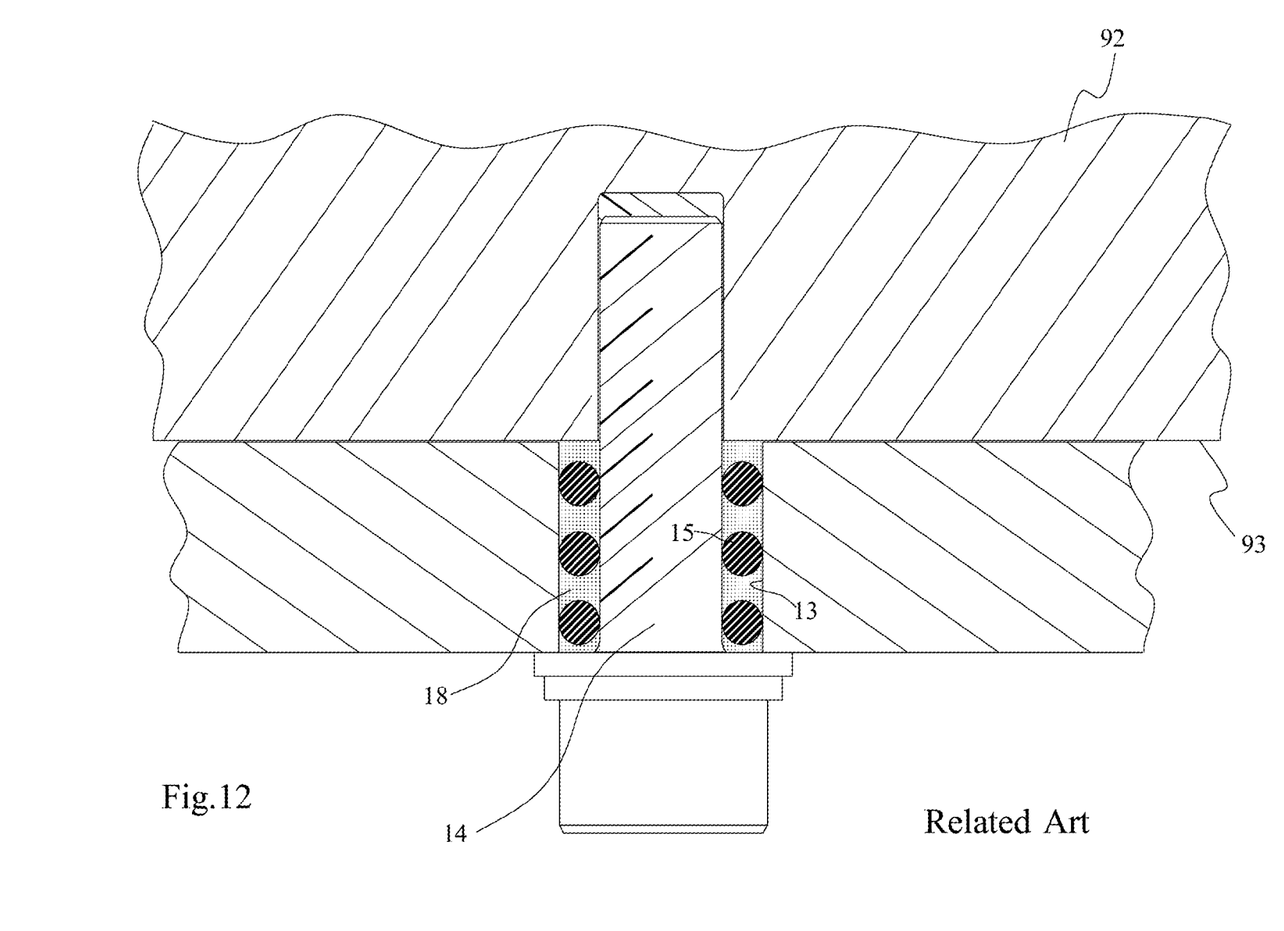
FIG. 12 is a cross-sectional view of FIG. 11.

However, since vibrations and shocks are constantly generated in various industrial machines, the linear displacement measuring apparatus 10 needs to be prevented from rattling. Thus, a several O-rings 15 are interposed between the male screw 14 and the hole 13, and an adhesive 18 is poured into the gap to fix the position of the O-rings 15. FIG. 12 illustrates the cross-sectional view. The O-ring 15 functions to tolerate a lateral shift by supporting the scale housing case 12 elastically, and to center the male screw 14 to be at the center of the hole 13. The adhesive 18 is poured because the position of the O-ring 15 is not to be shifted.

This structure is simple, but excellent for stably installing a long linear displacement measuring apparatus 10 while tolerating a lateral shift.

SUMMARY OF THE INVENTION

Although the structure in FIGS. 11 and 12 is excellent, the inventors have found it has the following problems.

One of the problems is that it is difficult to pour the adhesive 18 into the gap. The adhesive 18 has viscosity, and it takes time, effort, and skill to pour the adhesive 18 into the hole 13. Furthermore, it is difficult to pour a right amount of the adhesive 18 into the hole. If the amount of the adhesive 18 is too small, the O-ring 15 is not sufficiently fixed. However, if the amount of the adhesive 18 is too large, the adhesive 18 is overflowed from the hole 13, which deteriorates the appearance and takes time to clearly wipe off it.

A purpose of the present invention is to provide a mounting tool, for a linear displacement measuring apparatus, which is capable of reducing thermal stress of a scale housing case.

A mounting tool according to an embodiment of the present invention is a mounting tool which mounts a linear displacement measuring apparatus on a mounting face, the mounting tool includes:

a bush inserted into a through hole drilled in a scale housing case;

an elastic body provided between the through hole and the bush;

a mounting screw inserted into the bush and screwed into the mounting face; and biasing means arranged between a head part of the mounting screw and the scale housing case, and biasing the scale housing case toward the mounting face.

In an embodiment of the present invention, it is preferable that the elastic body is rubber thermally welded to the bush.

In an embodiment of the present invention, it is preferable that the bush has a flange part projecting in a direction perpendicular to a shaft, and the biasing means is rubber thermally welded to a back face of the flange part.

In an embodiment of the present invention, it is preferable that the bush has a flange part projecting in a direction perpendicular to a shaft, the biasing means is a plate spring, and has a hole for inserting the mounting screw into a stand part which is a center part, and a leg part formed by being bended at an end of the stand part, and the leg part biases the scale housing case toward the mounting face while the stand part of the plate spring is being sandwiched between the flange part and the head part of the mounting screw.

In an embodiment of the present invention, it is preferable that a gap exists between the flange part and the scale housing case.

In an embodiment of the present invention, it is preferable that the flange part has a shape which is long in a length measurement direction and short in a direction perpendicular to the length measurement direction.

In an embodiment of the present invention, it is preferable that a stop ring fit onto the bush and preventing the bush from coming off from the through hole is included.

A linear displacement measuring apparatus according to an embodiment of the present invention is a linear displacement measuring apparatus capable of being mounted on a mounting face, the linear displacement measuring apparatus includes:

a scale housing case having a through hole;

a bush inserted into the through hole;

an elastic body between the through hole and the bush; and a stop ring fit onto the bush and preventing the bush from coming off from the through hole.

A method for mounting a linear displacement measuring apparatus according to an embodiment of the present invention includes:

inserting a mounting screw into the bush; and screwing the mounting screw into the mounting face.

DETAILED DESCRIPTION

Embodiments of the present invention are illustrated and described with reference to the reference signs attached to the elements in the drawings.

First Exemplary Embodiment

Figure 1:
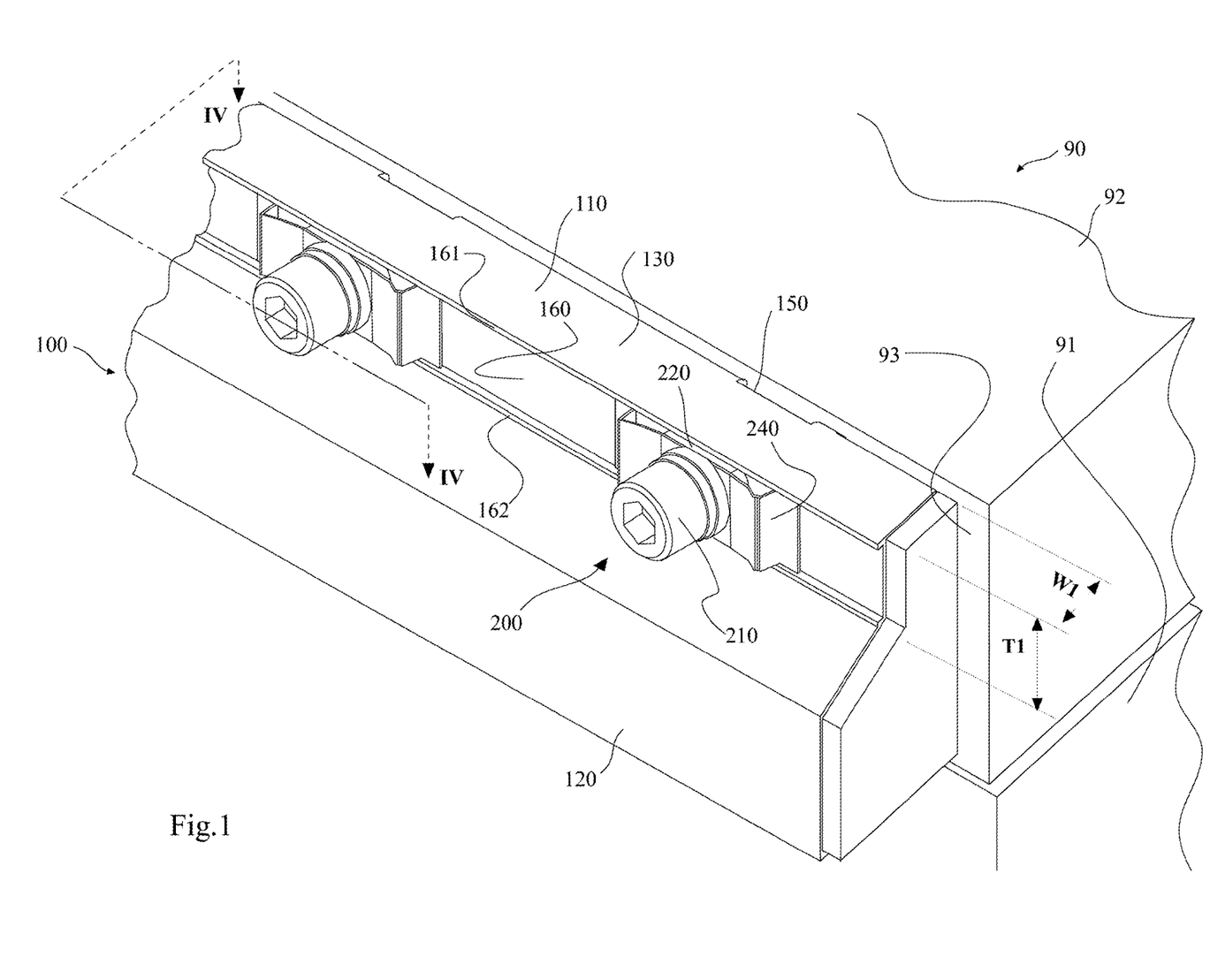
FIG. 1 is a diagram illustrating a linear displacement measuring apparatus mounted on a moving stage with a mounting tool according to the present exemplary embodiment.

Before a mounting tool 200 is described, a stage 92 which is a mounting face 93, and a linear displacement measuring apparatus 100 to be mounted are briefly described.

FIG. 1 is a diagram illustrating the linear displacement measuring apparatus 100 mounted on a moving stage 90 with the mounting tool 200 according to the present exemplary embodiment.

A plurality of screw holes 94 are provided on a side end face 93 of the stage 92 at specified intervals to screw the linear displacement measuring apparatus 100. (The screw hole 94 is illustrated in the cross-sectional view in FIG. 4.)

The position and size of the screw hole 94 is roughly determined according to the standard of the moving stage 90.

The linear displacement measuring apparatus 100 is briefly described below. A scale housing case 110 of the linear displacement measuring apparatus 100 is mounted on the mounting face 93 with the mounting tool 200.

Figure 3:
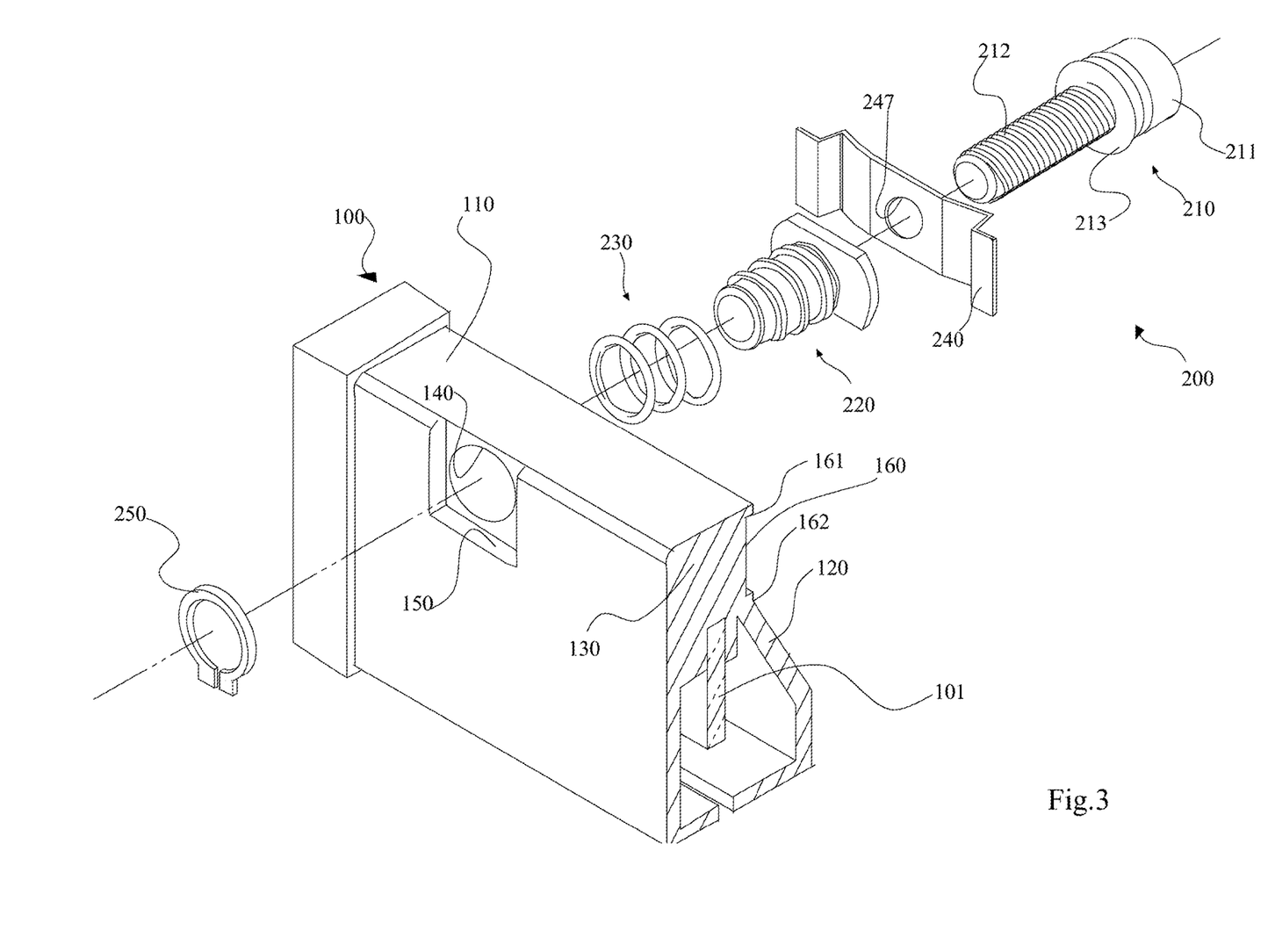
FIG. 3 is an exploded perspective view of the mounting tool when viewed from back side.

The scale housing case 110 has a hexagonal shape in which one angle of a rectangle is drawn inside to be an obtuse angle when viewed from the side. Here, as the cross-sectional of the scale housing case 110 is illustrated in FIG. 3, the scale housing case 110 can be described as a shape in which a rectangular head 130 is on a hollow pentagon 120 housing a main scale 101.

When the rectangular head 130 is mounted on the side end face 93 of the stage 92 with the mounting tool 200, the hollow pentagon 120 appears to be hanged. Thus, the rectangular head 130 is referred to a hanging frame part 130, and the hollow pentagon 120 is referred to as a hollow body 120.

The back face of the scale housing case 110 is a substantially flat face so as to be in close contact with the side end face 93 of the stage 92. The hanging frame part 130 has a front side face and a back-side face which are substantially parallel. By mounting the mounting tool 200 from the front side face, the hanging frame part 130 is pressed against the side end face 93 of the stage 92 with substantially no gap.

Taking the length of the screw into consideration, the width W1 of the hanging frame part 130 should be thinner. However, as to be described later, an appropriate elastic force is required to be maintained between the screw and the scale housing case 110 to interpolate an elastic ring (the O-ring 230). For this reason, the width W1 sufficient for housing two or more O-rings 230 in parallel is needed. The height T1 of the hanging frame part 130 is roughly determined according to the standard of the height of the stage 92 or the position of the screw hole 94 of the stage 92. If the height T1 of the hanging frame part 130 is desired to be a little longer, the height cannot be changed on the discretion of a measurement machine manufacturer (the manufacturer of a linear displacement measuring apparatus).

A plurality of through holes 140 is drilled in the hanging frame part 130 in the longitudinal direction at the same intervals as the screw holes 94 of the side end face 93 of the stage 92. At the part where the through hole 140 is provided, a shallow recess 150 is provided on the back face of the hanging frame part 130. An upper edge line 161 and a lower edge line 162 are projected in parallel sandwiching the through holes 140 on the front side of the hanging frame part 130 so as to form a shallow groove part 160 in the longitudinal direction.

The mounting tool 200 is described below.

Figure 2:
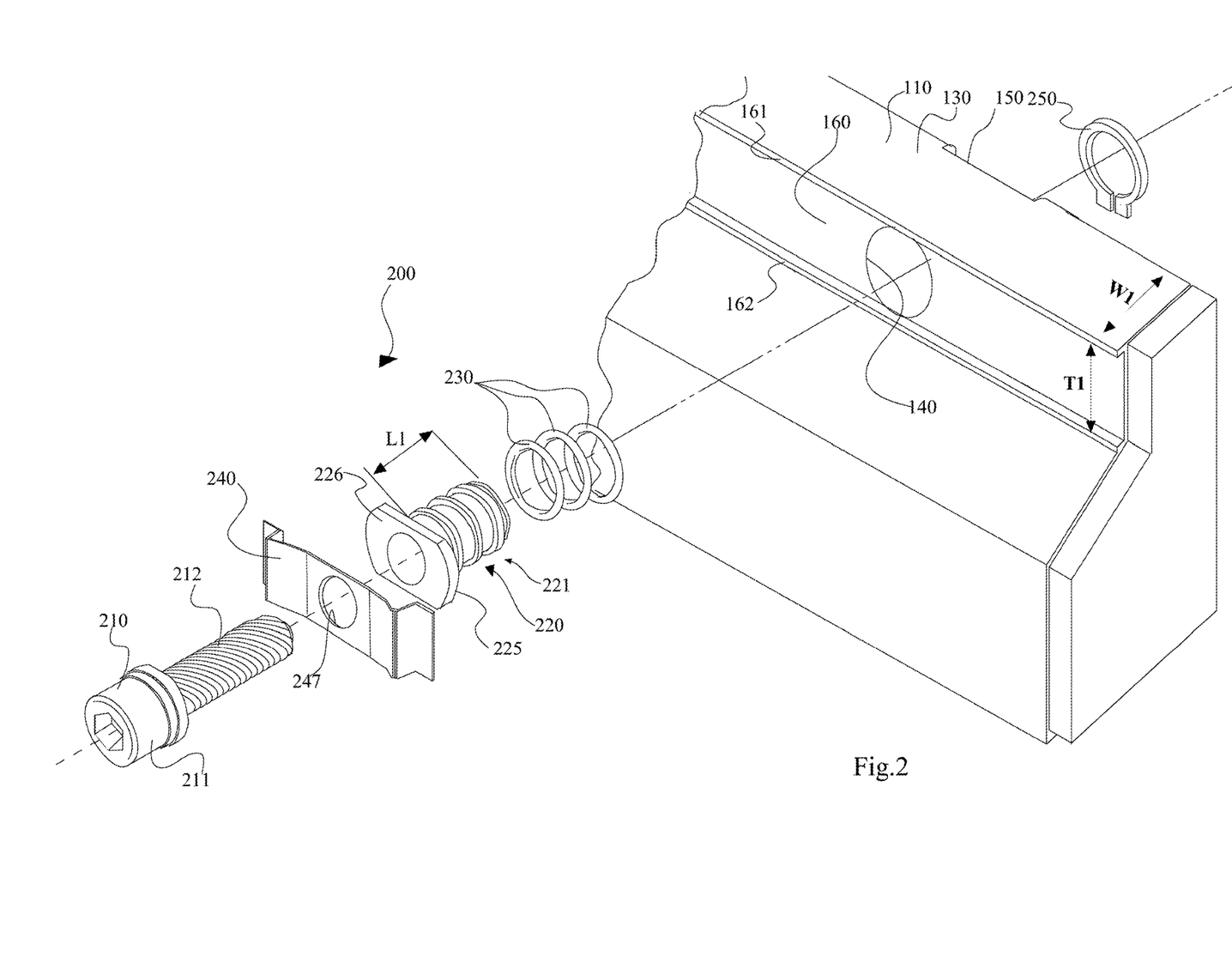
FIG. 2 is an exploded perspective view of the mounting tool when viewed from a front side.
Figure 4:
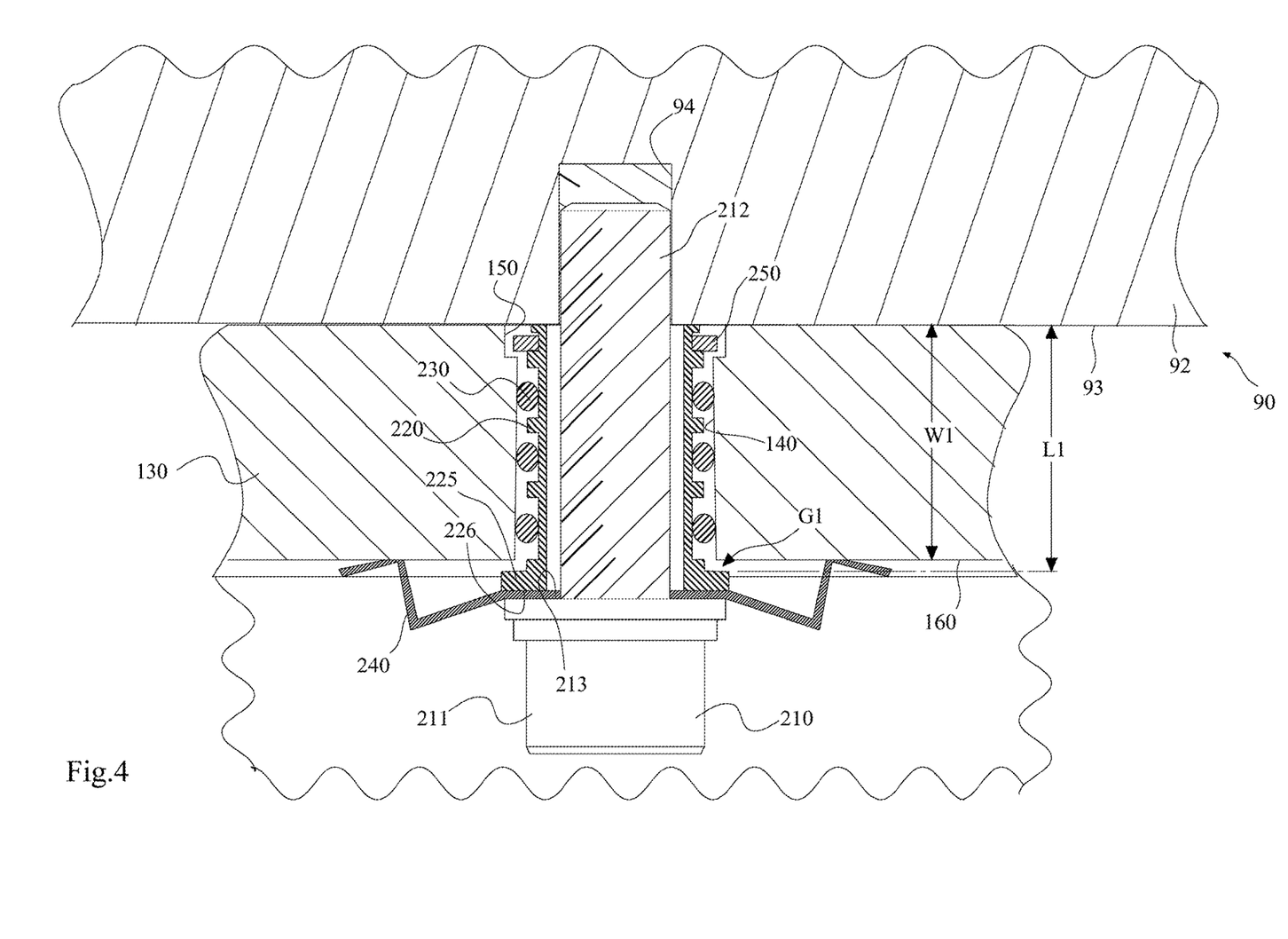
FIG. 4 is a cross-sectional view taken along a line VI-VI in FIG. 1.

FIGS. 2 and 3 are exploded perspective views of the mounting tool 200. FIG. 2 is the exploded perspective view when viewed from the front side, and FIG. 3 is the exploded perspective view when viewed from the back side. FIG. 4 is a cross-sectional view taken along the line VI-VI in FIG. 1.

The mounting tool 200 includes a mounting screw 210, a bush 220, an O-ring 230, a plate spring 240, and a stop ring 250.

Here, a mounting procedure is briefly described.

First, the O-ring 230 and the bush 220 are inserted into the through hole 140 of the hanging frame part 130. The stop ring 250 is fit onto the bush 220 from the back face of the hanging frame part 130. Then, the plate spring 240 is placed to cover the bush 220 from the front side, and the mounting screw 210 is screwed. In the background art, the mounting tool 200 corresponds to the elastic fixing block 50. Thus, the hole (not illustrated) substantially at the center of the scale housing case 110 is used for fixedly screwing the hanging frame part 130 without the mounting tool 200, the other holes (the through holes 140) are used for the mounting tools 200.

Each parts of the mounting tool 200 is described below.

The mounting screw 210 is what is called a male screw having a head part 211 and a screw shaft 212. The head part 211 projects to some extent, and has a flat seat surface 213. Here, it is obvious that the diameter of the head part 211 is a size larger than that of the through hole 140, but the diameter of the screw shaft 212 is a size smaller than that of the through hole 140. (The diameter of the through hole 140 is a size larger than that of the screw shaft 212.) That is, when the mounting screw 210 is inserted into the through hole 140, a gap is formed between the mounting screw 210 and the through hole 140. The bush 220 and the O-ring 230 are arranged in the gap.

When the mounting screw 210 is inserted from the front side of the hanging frame part 130, the shaft of the male screw 212 has a length sufficient for the tip side of the mounting screw 210 to be screwed into the screw hole 94.

As to be described later, in order to sandwich a flange part 225 of the bush 220 between the seat surface 213 and the hanging frame part 130, the shaft length of the male screw 212 is sufficiently longer than the width W1 of the hanging frame part 130.

The bush 220 has a cylindrical shape having both end openings, and is arranged in the gap between the screw shaft 212 and the through hole 140. The O-ring 230 is arranged in the gap between the screw shaft 212 and the through hole 140 in addition to the bush 220. For this reason, the bush 220 is designed so as to be thin. The inside diameter of the cylindrical hole of the bush 220 has a size into which the screw shaft 212 can be inserted, but it is preferable that the size is designed so that a slight clearance is secured between the cylindrical hole and the screw shaft 212.

Figure 5:
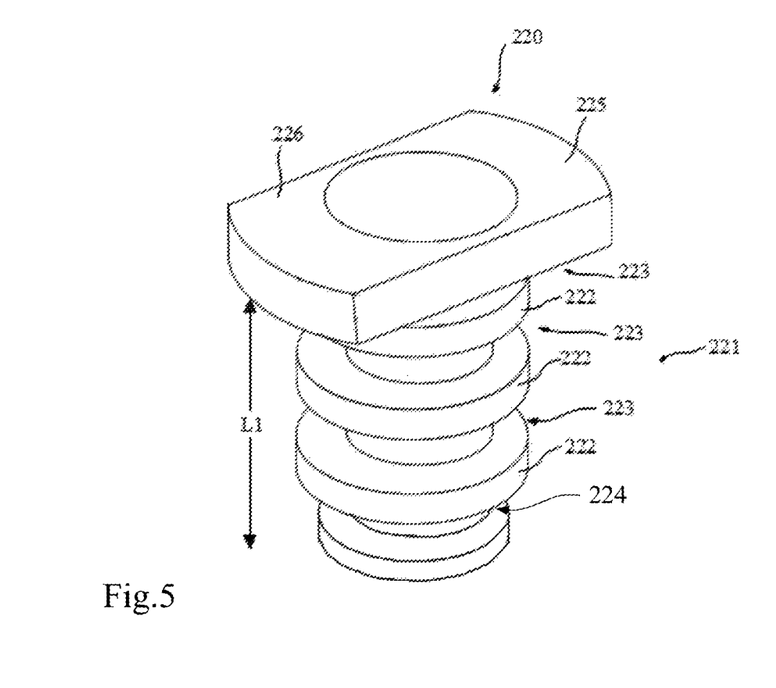
FIG. 5 is a perspective view of a bush.

FIG. 5 is a perspective view of the bush 220.

The bush 220 has a cylindrical body part 221 and a flange part 225 projecting from one end (referred to as a base end) of the body part 221.

On the outside face of the body part 221, a plurality of annular projecting lines 222 is provided round the body part 221. The projecting lines 222 are provided in the axial direction of the body part 221 at intervals. The projecting lines 222 are likened to bamboo nodes, and referred to as nodes 222, and the part between the nodes 222 are referred to as an internode part 223. The O-ring 230 is arranged at the internode part 223, and the node 222 serves as a partition having the height which the O-ring 230 cannot cross over. The node 222 is only required to serve as a partition, and is not to be necessarily provided continuously round the body part 221. The node 222 may be provided intermittently and be, for example, a projection projecting at intervals of predetermined angle (for example, 120°).

On the tip side of the body part 221, an annular recessed line 224 is formed round the body part 221. The stop ring 250 is fit onto the recessed line 224.

The flange part 225 projects from the base end of the body part 221 in the direction perpendicular to the shaft. Here, the flange part 225 has a shape which is not a circle nor an oval, but a shape in which the top and bottom of a circle or oval are cut off and two semicircles are connected two lines when viewed from the axial direction. It has been stated that the height T1 of the hanging frame part 130 is roughly determined according to the standard, and that the diameter of the through hole 140 is designed to be a size larger than that of the screw shaft 212. Under such restrictions, in order to sufficiently secure the projecting width of the flange part 225, the projections in the perpendicular direction are to be cut off, and the projections in the lateral direction (length measurement direction) are to be extended. A front side end face 226 of the flange part 225 is flat, and the plate spring 240 is sandwiched between the front side end face 226 of the flange part 225 and the seat surface 213 of the mounting screw 210.

The length L1 of the body part 221 of the bush 220 is slightly longer than the width W1 of the hanging frame part 130. The back face of the hanging frame part 130 is pressed against the side end face 93 of the stage 92 while the bush 220 is being inserted into the through hole 140. Here, when the tip of the body part 221 hits the side end face 93 of the stage 92, a gap G1 is slightly left between the back face of the flange part 225 and the side face (groove part 160) of the hanging frame part 130 (see FIG. 4).

That is, the flange part 225 of the bush 220 does not directly press the hanging frame part 130 (the scale housing case 110) against the side end face 93 of the stage 92.

(The plate spring 240 directly presses the hanging frame part 130 (the scale housing case 110) against the side end face 93 of the stage 92.)

The O-ring 230 is what is called an O-ring on the market. The O-ring 230 is inserted into the through hole 140 while being arranged at the internode part 223 of the body part 221.

The diameter of the O-ring 230 is selected so that the gap between the internode part 223 of the body part 221 and the inside wall of the through hole 140 is buried by the O-ring 230. That is, the O-ring 230 having an inside diameter almost as large as the outside diameter of the internode part 223, and an outside diameter larger than that of the projecting line 222 is used. Then, the O-ring 230 is fit onto the internode part 223. When the bush 220 is inserted into the through hole 140, the O-ring 230 is pressed by the inside wall of the through hole 140, and expanded in the internode part 223 in the axial line direction of the bush 220. Note that, the O-ring having the wire diameter of 1.5 mm and the inside diameter of 7.5 mm is used.

Since vibrations and shocks generated by various industrial machines need to be absorbed or buffered, it is preferable that a plurality of O-rings 230 is prepared.

The plate spring 240 is biasing means for pressing the scale housing case 110 against the side end face 93 of the stage 92.

Figure 6:
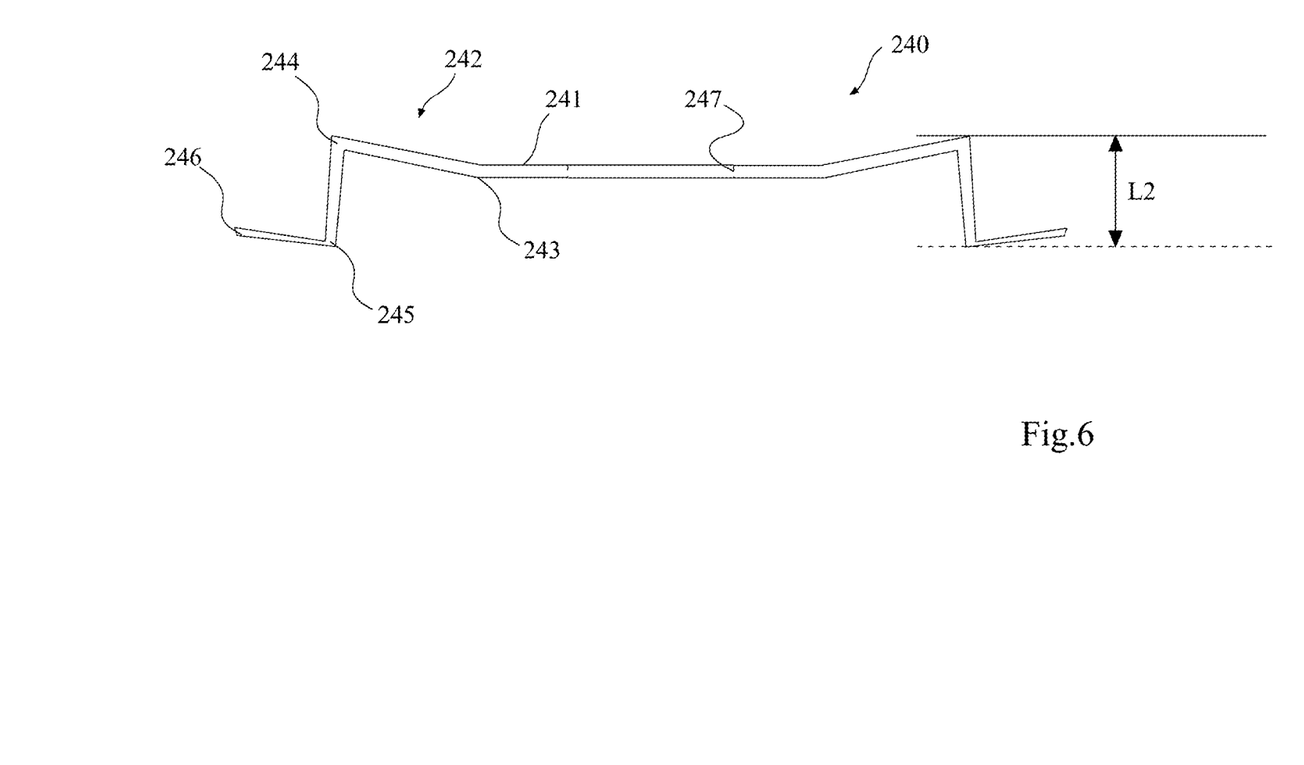
FIG. 6 is a side view of a plate spring.

FIG. 6 is a side view of the plate spring 240.

The plate spring 240 has a shape in which a metal belt-shaped thin plate is bent to be an M-shape. When viewed from the side, the plate spring 240 has a stand part 241 the center of which is substantially flat, and the stand part 241 looks like having legs 242 at both sides. When viewed from the front, the plate spring 240 has a hole 247, into which the screw shaft 212 of the mounting screw 210 can be inserted, at the center of the stand part 241.

The leg part 242 is formed by bending the end of the stand part 241. The shape of the leg part 242 is described with reference to the directions in FIG. 6. The upper part of FIG. 6 is referred as an upper side, and the lower part of FIG. 6 is referred to as a lower side. The leg part 242 begins by lightly bending the thin plate at the end of the stand part 241. This part is referred to as a root part 243 of the leg part 242. The leg part 242 is bent at the root part 243 and directed toward the direction upper than the stand part 241 at a shallow angle. Then, the leg part 242 is sharply bent at an angle of about 90° and directed downward. This sharp bending point 244 is referred to as a knee part 244. The leg part 242 is directed downward from the knee part 244, and bent at an angle of about 90° to form a heel part 245. A toe part 246 which is the rest part from the heel part 245 is bent to the opposite side to the stand part 241, that is, toward outside.

Figure 7:
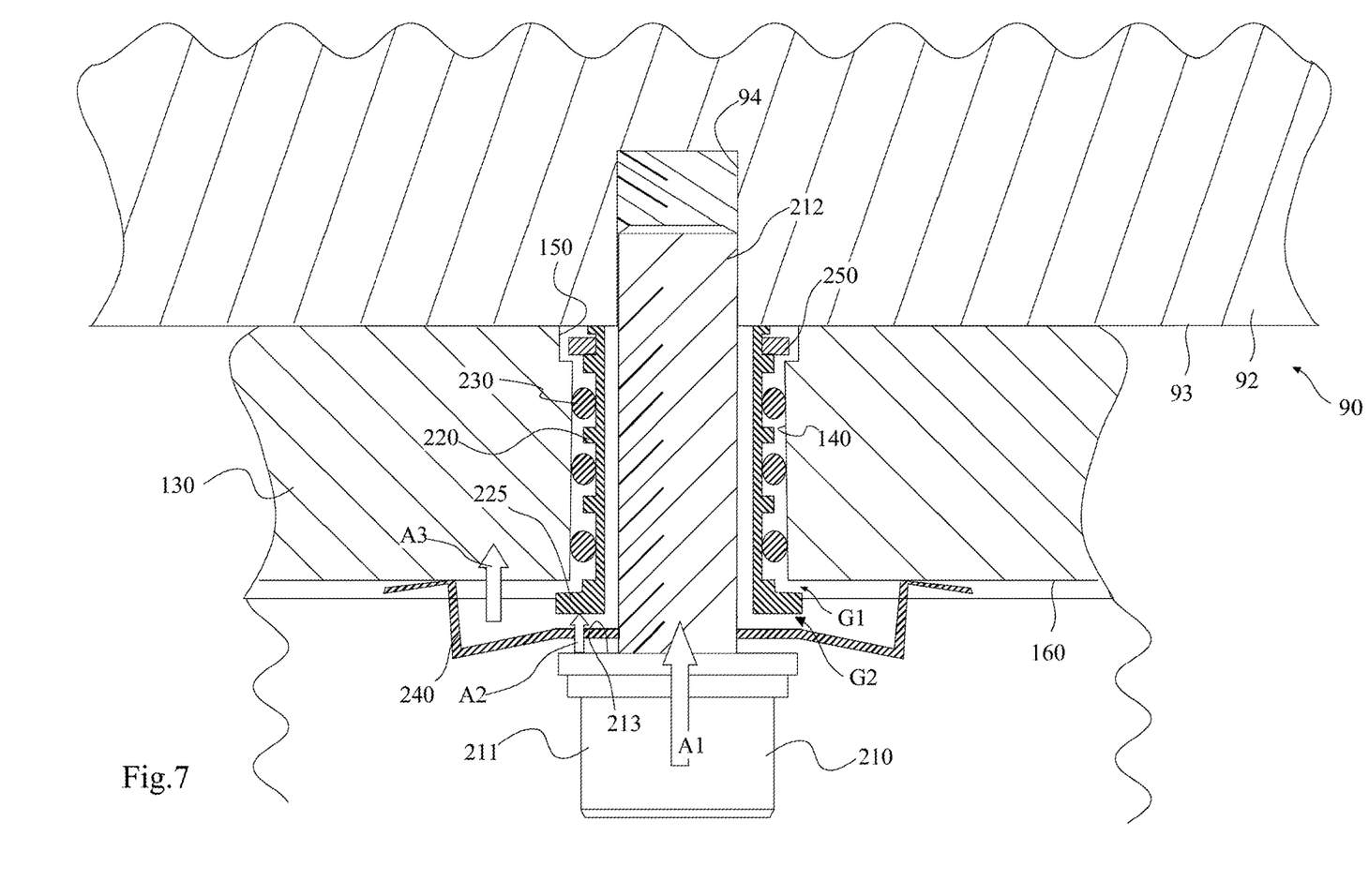
FIG. 7 is a cross-sectional view of a scale housing case being mounted on a stage with the mounting tool.

The width of the plate spring 240 is just the size fitting the groove part 160 provided on the front face of the hanging frame part 130 (for example, see FIG. 1). While no force is being applied to the plate spring 240, the height L2 from the heel part 245 to the stand part 241 is required to some extent. Here, FIG. 7 is a cross-sectional view of the scale housing case 110 being mounted on the stage 92 with the mounting tool 200.

It has been stated that the gap G1 is left between the flange part 225 of the bush 220 and the bottom face of the groove part 160 of the hanging frame part 130 while the tip of the bush 220 is hitting the side end face 93 of the stage 92. Here, it is assumed that the plate spring 240 is arranged to cover the flange part 225 of the bush 220. At this time, while the heel part 245 is in contact with the bottom face of the groove part 160, the stand part 241 is required to be floated from the flange part 225 of the bush 220 (the gap G2 in FIG. 7). Then, as the mounting screw 210 is tightened (arrow A1), the stand part 241 is pressed toward the flange part 225 by the seat surface 213 of the mounting screw 210 (arrow A2). The force of pressing the plate spring 240 by the seat surface 213 of the mounting screw 210 is propagated to the heel part 245. The heel part 245 biases the scale housing case 110 toward the side end face 93 of the stage 92 with the force caused by the distortion gathered at the root part 243. In this manner, the linear displacement measuring apparatus 100 (the scale housing case 110) is in close contact with the side end face 93 of the stage 92, and pressed by the plate spring 240, and the linear displacement measuring apparatus 100 is prevented from rattling accordingly.

The stop ring 250 is what is called a C-shaped ring (C-shaped lock ring). The stop ring 250 is fit onto the recessed line 224 formed at the tip side of the bush 220. The stop ring 250 is fit onto the bush 220 from the back side of the hanging frame part 130 so that the bush 220 is not to come off from the through hole 140 as illustrated in FIG. 4 or 7. Note that, the recess 150 is provided at the back side of the hanging frame part 130 so that the stop ring 250 does not project from the back face of the hanging frame part 130.

The stop ring 250 is a stopper for the bush 220, and may not be provided in consideration only of mounting the linear displacement measuring apparatus 100 (the scale housing case 110). However, the stop ring 250 remarkably makes the mounting work of the linear displacement measuring apparatus 100 (the scale housing case 110) efficient. That is, a measurement machine manufacturer attaches the bush 220 to the scale housing case 110 in advance at its factory. The O-ring 230 is arranged at the internode part 223 of the body part 221, and the bush 220 is inserted into the through hole 140 and stopped by the stop ring 250. When the linear displacement measuring apparatus 100 is mounted on an industrial machine at a client's factory, the plate spring 240 is placed on the bush 220, and the mounting screw 210 is screwed.

The number of mounting points of a long linear displacement measuring apparatus 100 of 2 or 3 m can be 20 to 30. If a work needs such large number of bushes 220 or O-rings 230 at a client's factory, it is difficult and inefficient to manage the parts. Considering this point, the O-ring 230 and the bush 220 have been already mounted at the measurement machine manufacturer's factory, which is efficient to work at a client' factory.

The mounting tool 200 having such a structure according to the present exemplary embodiment has the following effects:

(1) In the mounting tool according to the present exemplary embodiment, the bush 220 is inserted into the through hole 140 of the scale housing case 110, and the O-ring 230 is sandwiched between the bush 220 and the inside wall of the through hole 140. Then, the internode part 223 is provided on the circumference of the bush 220 to stably arrange the O-ring 230. Consequently, the O-ring 230 does not need to be fixed with an adhesive. This greatly contributes to the efficiency of the mounting work. Furthermore, since the O-ring 230 is not fixed with an adhesive, it is detachable.

(2) The bush 220 on which the O-ring 230 is arranged can be stopped in the through hole 140 by the stop ring 250. Accordingly, the O-ring 230 and the bush 220 do not need to be separately considered in the mounting work, and using the bush 220 is substantially equivalent to just screwing. Thus, the mounting work becomes simple, and does not need a special skill.

Second Exemplary Embodiment

A second exemplary embodiment of the present invention is described below.

Figure 8:
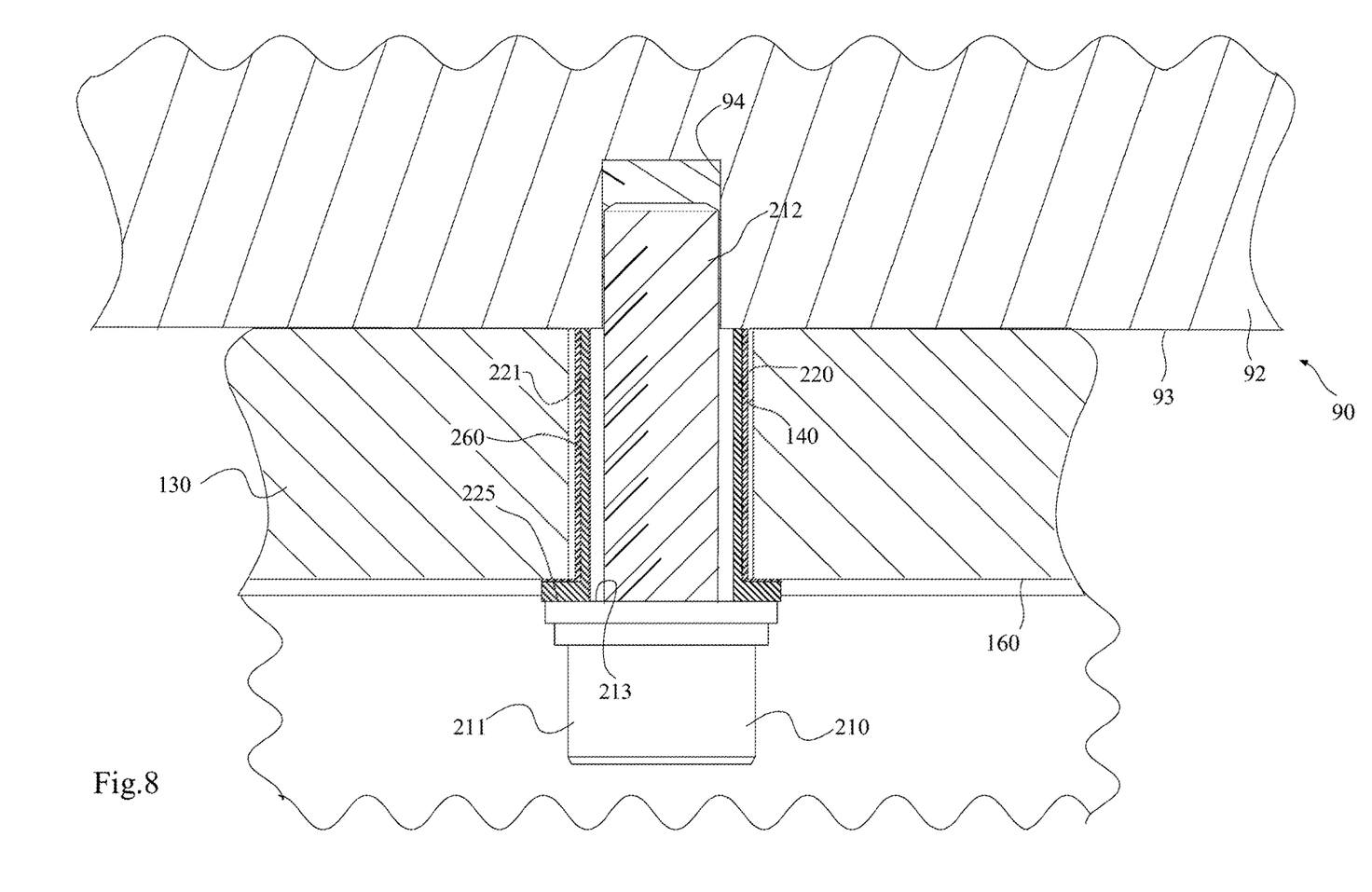
FIG. 8 is a diagram explaining a second exemplary embodiment.

The basic structure in the second exemplary embodiment is the same as that in the first exemplary embodiment. However, in the second exemplary embodiment, an elastic body layer 260 is directly formed on a bush 220 instead of fitting an O-ring 230 onto the bush 220.

FIG. 8 illustrates the second exemplary embodiment.

As illustrated in FIG. 8, the elastic body layer 260 made of rubber (resin) is thermally welded to the bush 220. Since the elastic body layer 260 is formed directly on the bush 220, a projecting line 222 and an internode part 223 for fitting an O-ring are not required, and a body part 221 has a straight side face.

The elastic body layer 260 is formed on the side face of the body part 221 and the back face of a flange part 225.

The thickness of the elastic body layer 260 is, for example, about 0.5 to 0.7 mm on the side face of the body part 221, and about 0.2 mm on the back face of the flange part 225.

In FIG. 8, there appears a gap between a through hole 140 of a hanging frame part 130 and the elastic body layer 260, but the gap may be buried with, for example, a silicone adhesive. That is, before the bush 220 inserted into the through hole 140, a silicone adhesive may be thinly applied to the outside of the elastic body layer 260.

Alternatively, the through hole 140 and the elastic body layer 260 may be designed so as not to form a gap, and the bush 220 may be forcibly inserted into the through hole 140.

In the second exemplary embodiment, the width of the hanging frame part 130 is to be substantially the same as the length of the body part 221 of the bush 220, or to be slightly shorter than the length of the body part 221 of the bush 220, that is, the width of the hanging frame part 130.

Then, when the mounting screw 210 is inserted into the bush 220 and screwed into the hole 94 of the stage 92, the seat surface 213 of the mounting screw 210 is to press the hanging frame part 130 via the flange part 225 of the bush 220. At this time, the elastic body layer 260 formed on the back face of the flange part 225 is to be a cushion and biasing means for pressing the hanging frame part 130 with an appropriate force.

Although not illustrated in FIG. 8, a stop ring 250 may be attached to the bush 220 according to the second exemplary embodiment as a stopper.

Note that, the present invention is not limited to the above embodiments, and can be appropriately changed without deviating from the scope.

In the above embodiments, the plate spring 240 has been sandwiched between the flange part 225 of the bush 220 and the head part 211 of the mounting screw 210.

Alternatively, by arranging an elastic member at the gap G1 between the flange part 225 of the bush 220 and the hanging frame part 130, an equivalent function can be obtained.

(When an elastic member is arranged at the gap G1, the head part of the mounting screw exists outside of the flange part, and thus the elastic member is certainly arranged between the head part of the mounting screw and the outside face of the scale housing case in this case.)

It has been described that the flange part of the bush has a shape which is long laterally (in the length measurement direction), but the flange part may have a circular shape according to the shape of the hanging frame part.

The invention claimed is:

1. A mounting tool, for a linear displacement measuring apparatus, which mounts the linear displacement measuring apparatus on a mounting face, the mounting tool comprising:
   a bush inserted into a through hole drilled in a scale housing case;
   an elastic body provided between the through hole and the bush;
   a mounting screw inserted into the bush and screwed into the mounting face; and
   biasing means arranged between a head part of the mounting screw and the scale housing case, and biasing the scale housing case toward the mounting face, wherein
   the bush has a flange part projecting in a direction perpendicular to a shaft, and
   the biasing means is rubber thermally welded to a back face of the flange part.

2. The mounting tool for the linear displacement measuring apparatus according to claim 1, wherein the flange part has a shape which is long in a length measurement direction and short in a direction perpendicular to the length measurement direction.

3. The mounting tool for the linear displacement measuring apparatus according to claim 1, further comprising a stop ring fit onto the bush and preventing the bush from coming off from the through hole.

4. The mounting tool for the linear displacement measuring apparatus according to claim 1, wherein the linear displacement measuring apparatus comprises:
   a scale housing case having a through hole;

a bush inserted into the through hole;

an elastic body between the through hole and the bush; and a stop ring fit onto the bush and preventing the bush from coming off from the through hole.

5. A method for mounting the linear displacement measuring apparatus with the mounting tool according to claim 4, the method comprising:

inserting a mounting screw into the bush; and screwing the mounting screw into the mounting face.

6. The mounting tool for the linear displacement measuring apparatus according to claim 1, wherein the elastic body is rubber thermally welded to the bush.

7. A mounting tool, for a linear displacement measuring apparatus, which mounts the linear displacement measuring apparatus on a mounting face, the mounting tool comprising:

a bush inserted into a through hole drilled in a scale housing case;

an elastic body provided between the through hole and the bush;

a mounting screw inserted into the bush and screwed into the mounting face; and biasing means arranged between a head part of the mounting screw and the scale housing case, and biasing the scale housing case toward the mounting face, wherein the bush has a flange part projecting in a direction perpendicular to a shaft, the biasing means is a plate spring, and has a hole for inserting the mounting screw into a stand part which is a center part, and a leg part formed by being bended at an end of the stand part, and the leg part biases the scale housing case toward the mounting face while the stand part of the plate spring is being sandwiched between the flange part and the head part of the mounting screw.

8. The mounting tool for the linear displacement measuring apparatus according to claim 7, wherein a gap exists between the flange part and the scale housing case.

9. The mounting tool for the linear displacement measuring apparatus according to claim 7, wherein the elastic body is rubber thermally welded to the bush.

10. The mounting tool for the linear displacement measuring apparatus according to claim 7, further comprising a stop ring fit onto the bush and preventing the bush from coming off from the through hole.

11. The mounting tool for the linear displacement measuring apparatus according to claim 7, wherein the linear displacement measuring apparatus comprises:

a scale housing case having a through hole;

a bush inserted into the through hole;

an elastic body between the through hole and the bush; and a stop ring fit onto the bush and preventing the bush from coming off from the through hole.

12. A method for mounting the linear displacement measuring apparatus with the mounting tool according to claim 11, the method comprising:

inserting a mounting screw into the bush; and screwing the mounting screw into the mounting face.

* * * * *